(12) United States Patent
Ando et al.

(10) Patent No.: US 12,034,141 B2
(45) Date of Patent: Jul. 9, 2024

(54) HEAT-INSULATING SHEET FOR BATTERY PACK, AND BATTERY PACK

(71) Applicant: IBIDEN CO., LTD., Ogaki (JP)

(72) Inventors: Hisashi Ando, Ibi-gun (JP); Naoki Takahashi, Ibi-gun (JP)

(73) Assignee: IBIDEN CO., LTD., Ogaki (JP)

( * ) Notice: Subject to any disclaimer, the term of this patent is extended or adjusted under 35 U.S.C. 154(b) by 0 days.

(21) Appl. No.: 17/275,191

(22) PCT Filed: Aug. 26, 2020

(86) PCT No.: PCT/JP2020/032193
§ 371 (c)(1),
(2) Date: Mar. 11, 2021

(87) PCT Pub. No.: WO2021/039844
PCT Pub. Date: Mar. 4, 2021

(65) Prior Publication Data
US 2022/0200080 A1 Jun. 23, 2022

(30) Foreign Application Priority Data
Aug. 27, 2019 (JP) ................. 2019-154855

(51) Int. Cl.
*H01M 10/658* (2014.01)
*F16L 59/02* (2006.01)
*H01M 10/61* (2014.01)
*H01M 10/625* (2014.01)
*H01M 10/651* (2014.01)
(Continued)

(52) U.S. Cl.
CPC ....... *H01M 10/658* (2015.04); *H01M 10/651* (2015.04); *H01M 10/6555* (2015.04)

(58) Field of Classification Search
None
See application file for complete search history.

(56) References Cited

U.S. PATENT DOCUMENTS

| 2012/0028107 A1* | 2/2012 | Sugita | H01M 10/6555 |
| | | | 429/156 |
| 2013/0210303 A1* | 8/2013 | Doi | B32B 17/02 |
| | | | 428/688 |

(Continued)

FOREIGN PATENT DOCUMENTS

| JP | 2005-281051 | 10/2005 |
| JP | 2007-211958 | 8/2007 |

(Continued)

OTHER PUBLICATIONS

International Search Report for corresponding International Application No. PCT/JP2020/032193, Oct. 27, 2020.
(Continued)

*Primary Examiner* — Lisa S Park
(74) *Attorney, Agent, or Firm* — MORI & WARD, LLP (57) ABSTRACT

A heat-insulating sheet for a battery pack is interposed between battery cells of the battery pack in which the battery cells are connected in series or in parallel. The heat-insulating sheet for the battery pack contains a first particle made from a silica nanoparticle and a second particle made from a metal oxide. A content of the first particle is 60 mass % or more and 95 mass % or less relative to a total mass of the first particle and the second particle.

16 Claims, 4 Drawing Sheets

(51) Int. Cl.
*H01M 10/6555* (2014.01)
*H01M 50/204* (2021.01)

(56) References Cited

U.S. PATENT DOCUMENTS

| | | | | |
|---|---|---|---|---|
| 2015/0204233 | A1* | 7/2015 | Nanba | F02B 23/08 |
| | | | | 427/302 |
| 2015/0204477 | A1* | 7/2015 | Menzel | C04B 30/02 |
| | | | | 252/62 |
| 2017/0098806 | A1 | 4/2017 | Bowersock et al. | |
| 2017/0214103 | A1 | 7/2017 | Onnerud et al. | |
| 2017/0297298 | A1 | 10/2017 | Tsumura et al. | |
| 2019/0140237 | A1* | 5/2019 | Kaye | H01M 10/653 |
| 2022/0173454 | A1* | 6/2022 | Kogami | H01M 50/249 |
| 2022/0190403 | A1* | 6/2022 | Mizuta | D21H 13/24 |

FOREIGN PATENT DOCUMENTS

| | | |
|---|---|---|
| JP | 2012-145204 | 8/2012 |
| JP | 2012-149658 | 8/2012 |
| JP | 2012-166977 | 9/2012 |
| JP | 2015-175285 | 10/2015 |
| JP | 2015-211013 | 11/2015 |
| JP | 2016-40226 | 3/2016 |
| JP | 2016-056903 | 4/2016 |
| JP | 2016-065360 | 4/2016 |
| JP | 2016-088819 | 5/2016 |
| JP | 2017-523584 | 8/2017 |
| JP | 2018-146098 | 9/2018 |
| JP | 2018-204708 | 12/2018 |
| JP | 2019-83150 | 5/2019 |
| JP | 2019-131654 | 8/2019 |
| WO | WO 2019/155714 | 8/2019 |

OTHER PUBLICATIONS

Written Opinion for corresponding International Application No. PCT/JP2020/032193, Oct. 27, 2020.

Sugino, "Suspension rheology of fumed silica and wet silica", a master's thesis of 2016 academic year written by a graduate of Mie University Graduate School of Engineering, Predoctoral Program, Molecular Materials Engineering, Organic Materials Chemistry Laboratory, Japan (w/ machine translation of pp. 1 to 3).

The Society of Powder Technology, "Handbook of Powder Engineering, Second Edition", Mar. 30, 1998, pp. 574 to 579, Nikkan Kogyo Shimbun, Tokyo, Japan (w/ machine translation of pp. 575 to 579).

\* cited by examiner

HEAT-INSULATING SHEET FOR BATTERY PACK, AND BATTERY PACK

TECHNICAL FIELD

The present invention relates to a heat-insulating sheet for a battery pack, which is interposed between battery cells of a battery pack, and a battery pack in which a heat-insulating sheet for a battery pack is interposed between battery cells.

BACKGROUND ART

Conventionally, in order to suppress heat transfer from a heating element to another object, a heat-insulating sheet disposed in proximity to the heating element or in the state of at least part being brought into contact with the heating element is used.

Furthermore, in recent years, in view of environmental protection, development of an electric vehicle, a hybrid electric vehicle, etc., which are driven by an electric motor, is aggressively promoted. In the electric vehicle, hybrid electric vehicle, etc., a battery pack in which a plurality of battery cells are connected in series or in parallel is mounted to serve as a power source of an electric driving motor.

For the battery cell, a lithium ion secondary battery capable of achieving high capacity and high output compared with a lead acid battery, a nickel metal hydride battery etc. is mainly used. In a battery capable of achieving high capacity and high output, when thermal runaway of causing a rapid temperature rise of a certain battery cell due to internal short-circuit, overcharge, etc. of the battery and thereafter keeping on with heat generation occurs, heat from a battery cell experienced thermal runaway may propagate to another adjoining battery cell to cause thermal runaway of the another battery cell.

In such a battery pack field as well, various heat-insulating sheets interposed between battery cells have been proposed for suppressing propagation of heat from a battery cell experienced thermal runaway to an adjoining battery cell and thereby preventing the cycle of thermal runaway. For example, Patent Literature 1 discloses an electric storage device in which two plate materials are disposed to face each other between two adjoining electric storage elements and a space formed between these plate materials functions as a low thermal conductive layer. Incidentally, in the electric storage device above, for example, a dammar material, etc. formed by collecting and bonding mica pieces is used as the plate material.

Meanwhile, in a battery pack, individual battery cells repeat charge/discharge and thereby undergo thermal expansion, and this allows a pressing force to repeatedly act between adjoining battery cells. In the thermal transfer suppressing sheet described in Patent Literature 1, since the low thermal conductive layer is an air layer, the mechanical strength cannot be sufficient enough to resist such a repeatedly acting pressing force.

In addition, since the battery cell having experienced thermal runaway is subject to a large thermal expansion, the pressing force on an adjoining battery cell also becomes excessive at that time, and thus, in the electric storage device described in Patent Literature 1, there is a concern about breakage of the plate material composed of a dammar material, etc. due to a large pressing force on the occurrence of thermal runaway.

To solve this concern, Patent Literature 2 has proposed, as a heat insulator loaded between adjoining battery cells, a heat insulator including a composite layer consisting of a fiber sheet and a silica aerogel having a nanosize porous structure. In a battery unit using the heat insulator above, even when a battery cell repeatedly undergoes expansion and contraction and a compressive stress is thereby applied to the heat insulator, the fiber sheet can absorb the stress. As a result, damage to the silica aerogel can be suppressed, and a reduction in the heat-insulating properties of the silica aerogel can be prevented.

PRIOR ART DOCUMENTS

Patent Literature

Patent Literature 1: JP 2015-211013 A
Patent Literature 2: JP 2018-204708 A

SUMMARY OF INVENTION

Technical Problem

However, there is a problem that even in the case of using the heat insulator described in Patent Literature 2, the heat-insulating performance in a high temperature range is not sufficiently obtained. If the heat insulator does not adequately function when the battery cell reaches a high temperature, a plurality of cells may be thermally expanded to further highly compress the heat insulator disposed in the same battery case and greatly increase the density of the heat insulator. As a result, the thermal conductivity of the heat insulator more increases, and desired heat-insulating performance cannot be maintained. Furthermore, when the heat insulation effect of the heat insulator is reduced, if abnormal heat generation occurs in the battery, it may be impossible to suppress troubles such as spreading of a fire or explosion of the battery. Accordingly, development of a battery-pack heat-insulating sheet having excellent heat-insulating performance even in a high-temperature range of 500° C. or more is being demanded.

The present invention has been made in consideration of the above-described circumstances, and an object thereof is to provide a heat-insulating sheet for a battery pack, ensuring that an excellent heat-insulating performance can be obtained in a wide temperature range from a temperature during normal use of a battery to a high temperature of 500° C. or more and preferably, even when the compressive stress on the heat-insulating sheet for a battery pack is increased, the excellent heat-insulating performance can be maintained, and a battery pack in which the heat-insulating sheet for a battery pack is interposed between battery cells.

Solution to Problem

The object above is attained by the heat-insulating sheet for a battery pack of the following (1) according to the present invention.
(1) A heat-insulating sheet for a battery pack, the heat-insulating sheet being interposed between battery cells of the battery pack in which the battery cells are connected in series or in parallel, in which the heat-insulating sheet for the battery pack contains a first particle made from a silica nanoparticle and a second particle made from a metal oxide, and in which a content of the first particle is 60 mass % or more and 95 mass % or less relative to a total mass of the first particle and the second particle.

In addition, preferred embodiments of the heat-insulating sheet for a battery pack of the present invention are the following (2) to (9).

(2) The heat-insulating sheet for the battery pack according to (1), in which the first particle has an average particle diameter of 1 nm or more and 100 nm or less.
(3) The heat-insulating sheet for the battery pack according to (1) or (2), in which the second particle is at least one kind selected from titania, zirconia, zircon, barium titanate, zinc oxide, and alumina.
(4) The heat-insulating sheet for the battery pack according to any one of (1) to (3), in which the second particle is titania.
(5) The heat-insulating sheet for the battery pack according to any one of (1) to (4), in which the second particle has an average particle diameter of 0.1 µm or more and 50 µm or less.
(6) The heat-insulating sheet for the battery pack according to any one of (1) to (5), containing a binding material made from at least one kind selected from a fiber, a binder and a heat-resistant resin, in which a content of the binding material is 10 mass % or more and 60 mass % or less relative to a total mass of the heat-insulating sheet for the battery pack.
(7) The heat-insulating sheet for the battery pack according to any one of (1) to (6), containing 60 mass % or less of an inorganic balloon relative to the total mass of the heat-insulating sheet for the battery pack.
(8) The heat-insulating sheet for the battery pack according to (7), in which the inorganic balloon is at least one kind selected from shirasu balloon, silica balloon, fly ash balloon, perlite balloon, and glass balloon.
(9) The heat-insulating sheet for the battery pack according to (7) or (8), in which the inorganic balloon has an average particle diameter of 1 µm or more and 100 µm or less.

The object above is attained by a battery pack of the following (10) according to the present invention.
(10) A battery pack, in which battery cells are disposed via the heat-insulating sheet for the battery pack according to any one of (1) to (9), and in which the battery cells are connected in series or in parallel.

Advantageous Effects of Invention

According to the present invention, a heat-insulating sheet for a battery pack, ensuring that an excellent heat-insulating performance can be obtained in a wide temperature range from a temperature during normal use of a battery to a high temperature of 500° C. or more and preferably, even when the compressive stress on the heat-insulating sheet for a battery pack is increased, the excellent heat-insulating performance can be maintained, and a battery pack in which the heat-insulating sheet for a battery pack is interposed between battery cells, can be provided.

EMBODIMENTS FOR CARRYING OUT THE INVENTION

The present inventors have made intensive studies so as to provide a battery-pack heat-insulating sheet (hereinafter, sometimes referred to as "heat-insulating sheet") capable of obtaining an excellent heat-insulating performance in a wide temperature range from a temperature during normal use of a battery to a high temperature of 500° C. or more. As a result, it has been found that when the heat-insulating sheet contains a first particle made from a silica nanoparticle and a second particle made from a metal oxide and the mass ratio of the first particle and the second particle is appropriately adjusted, an excellent heat-insulating performance can be obtained also in a high temperature range.

The silica nanoparticle contained as the first particle in the heat-insulating sheet suppresses conductive heat transfer owing to its low density and furthermore, since voids are finely dispersed, exhibits an excellent heat-insulating performance of suppressing convective heat transfer. Accordingly, transfer of heat between adjoining silica nanoparticles can be suppressed during normal use of a battery in an ordinary temperature range. However, the first particle has a small light-shielding effect because of its low density and small particle diameter and is less effective in suppressing radiative heat transfer. Therefore, a metal oxide having a high refractive index and a strong effect of causing diffuse reflection of light is incorporated as the second particle and radiative heat transfer can thereby be suppressed particularly in a high temperature range such as abnormal heat generation. Consequently, when a silica nanoparticle and a metal oxide are contained at an appropriate ratio in the heat-insulating sheet, an excellent heat-insulating performance can be obtained in a wide temperature range from a temperature during normal use of a battery to a high temperature of 500° C. or more.

In addition, the present inventors have found that when silica nanoparticles having a small average particle diameter are used in the heat-insulating sheet, even if the heat-insulating sheet is compressed by swelling, etc. of the battery and the density of the heat-insulating sheet is increased, a rise in the conductive heat transfer of the heat-insulating sheet can be suppressed.

This effect is considered to occur because the silica nanoparticles are an insulator and easily allow for formation of a fine void between particles due to electrostatic repulsive force, leaving the particles to fill with a low bulk density in a cushioned manner. More specifically, when silica nanoparticles having an average particle diameter of 1 nm or more and 100 nm or less are contained in the heat-insulating sheet, even if a compressive stress is applied, voids remaining between silica nanoparticles and many contact points between particles suppress conductive heat transfer, so that the heat-insulating performance of the heat-insulating sheet can be maintained.

Furthermore, the present inventors have found that the size of the void portion between particles contained in the heat-insulating sheet affects the heat-insulating performance of the heat-insulating sheet. More specifically, if the size of the void portion formed between particles is, for example, several hundreds of nm or more, a convection is likely to act in the void portion, and the heat-insulating performance of the heat-insulating sheet may be reduced.

However, in the heat-insulating sheet where silica nanoparticles having a small particle diameter are used as the first particle, it is considered that the size of the void portion between particles is, for example, as small as several tens of nm and consequently, air in the void portion is less likely to transfer, making it possible to suppress generation of convective heat transfer and still further enhance the heat-insulating performance.

Incidentally, it is important for the silica nanoparticle to form many fine voids and increase the number of contact points between particles, and the silica nanoparticle may be contained in the form of a primary particle or a secondary particle resulting from aggregation.

The present invention is based on these findings, and the heat-insulating sheet for a battery pack, and a battery pack according to the embodiment of the present invention (this embodiment) are described in detail by referring to the drawings.

<Basic Configuration of Heat-Insulating Sheet for Battery Pack>

Figure 1:
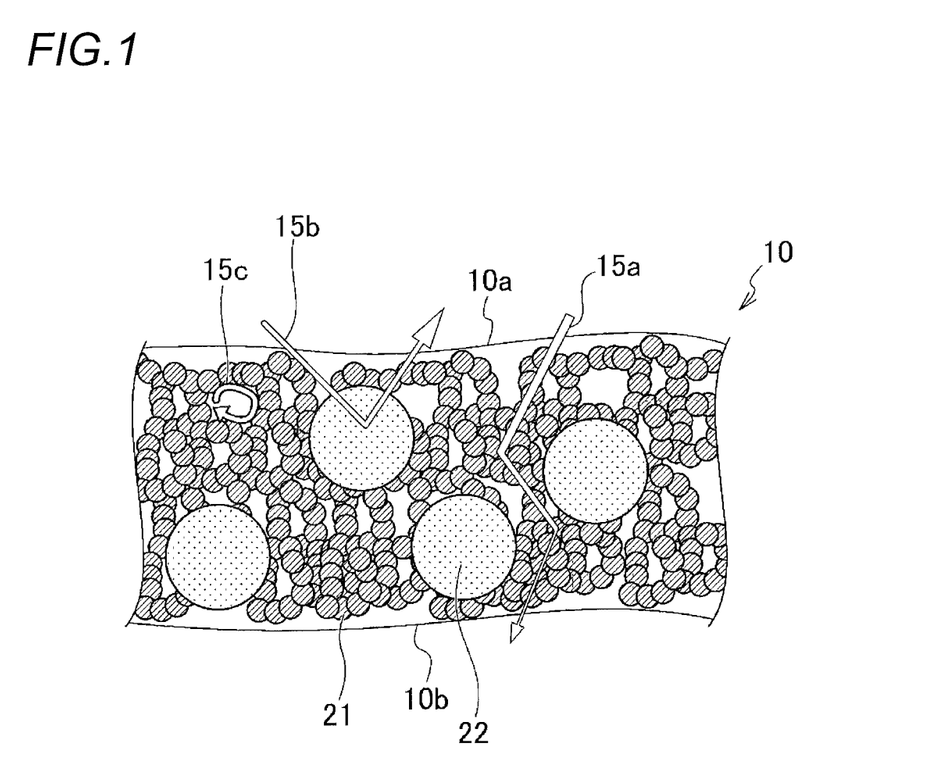
FIG. 1 is a schematic diagram illustrating a configuration of the heat-insulating sheet for a battery pack according to a first embodiment of the present invention.
Figure 2:
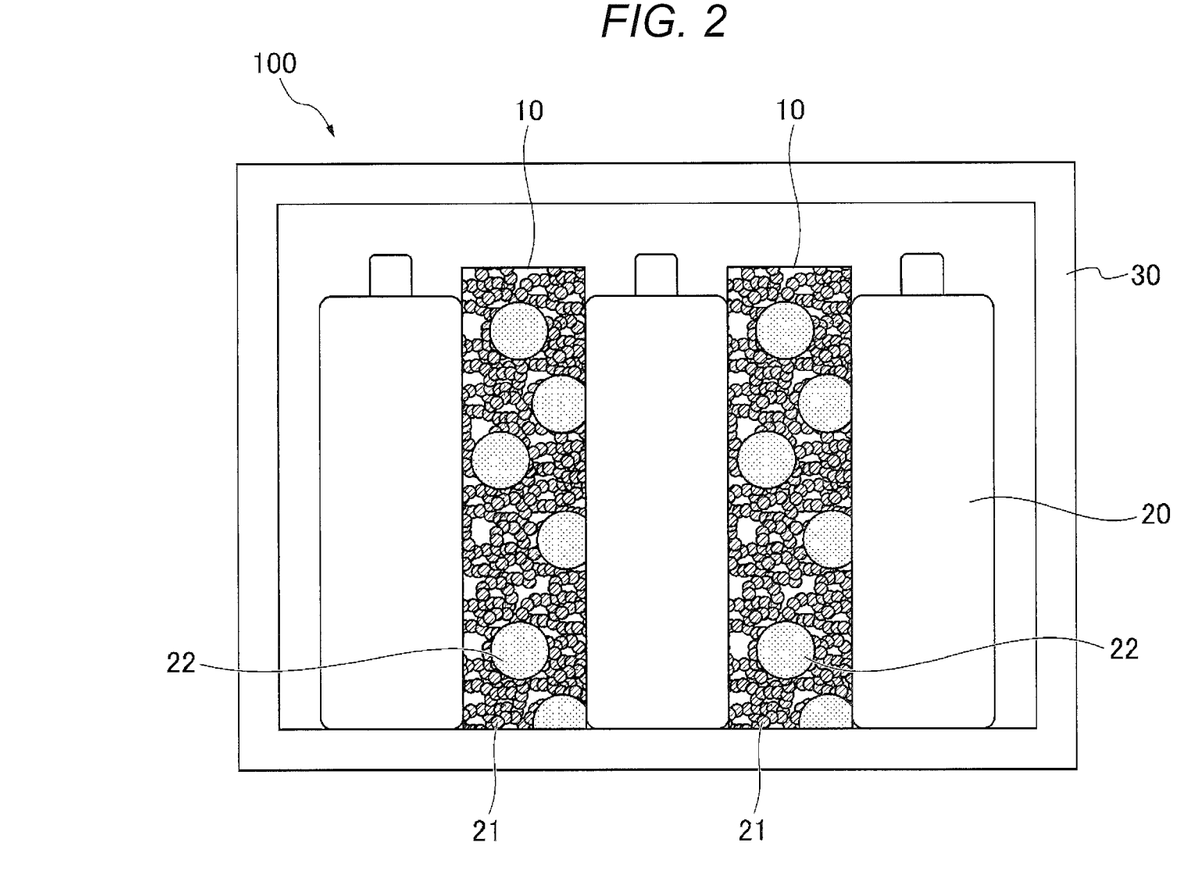
FIG. 2 is a cross-sectional diagram schematically illustrating an embodiment of the battery pack according to the present invention.

FIG. 1 is a schematic diagram illustrating a configuration of the heat-insulating sheet for a battery pack according to the embodiment of the present invention, and FIG. 2 is a cross-sectional diagram schematically illustrating an embodiment of the battery pack using the heat-insulating sheet for a battery pack illustrated in FIG. 1. In the heat-insulating sheet 10, a first particle 21 made from a silica nanoparticle and a second particle 22 made from titania (metal oxide) are contained.

Incidentally, as the silica nanoparticle, it is preferable to use particles having an average primary particle diameter of 1 nm or more and 100 nm or less.

With respect to the specific usage form of the heat-insulating sheet 10 for a battery pack, as illustrated in FIG. 2, a battery pack 100 is configured to dispose a plurality of battery cells 20 via a heat-insulating sheet 10 for a battery pack and store, in a battery case 30, the plurality of battery cells 20 in a state of being connected to each other in series or in parallel (depiction of the state of being connected is omitted).

Incidentally, as the battery cell 20, for example, a lithium ion secondary battery is favorably used, but the present invention is not limited thereto, and other secondary batteries are also applicable.

The following description assumes that a heat-generated battery cell 20 is present on one surface 10a side of the heat-insulating sheet 10. In the thus-configured heat-insulating sheet, when the battery cell 20 generates heat, part of heat input from the one surface 10a side of the heat-insulating sheet 10 is, as indicated by an arrow 15a, conducted (conductive heat transfer) toward another surface 10b of the heat-insulating sheet 10 through the mediation of first particles 21 which are in contact with each other. At this time, since a silica nanoparticle having heat-insulating performance is used as the first particle 21, the thermal resistance is high, and a large temperature difference from another surface 10b of the heat-insulating sheet 10 can be established, as a result, the amount of heat transfer is reduced.

In addition, when the battery cell 20 generates heat and part of the heat reaches the second particle 22 by radiation, as indicated by arrow 15b, the heat is diffusely reflected by the second particle 22 that is a metal oxide, and therefore, the presence of the second particle 22 can prevent heat from propagating to another surface 10b of the heat-insulating sheet 10.

As understood from these, when thermal runaway occurs in a certain battery cell 20, propagation of heat to the adjoining another battery cell can be effectively suppressed, so that the another battery cell can be prevented from occurrence of thermal runaway.

Incidentally, in this embodiment, a silica nanoparticle is used as the first particle 21, and since the contact point between particle is small, the amount of heat transferred via the silica nanoparticle is reduced compared with the case of using a silica particle having a large particle diameter obtained by pulverization. In addition, the commonly available silica nanoparticle has a bulk density of about 0.1 g/cm$^3$ and therefore, for example, even when the battery cells 20 disposed on both sides of the heat-insulating sheet 10 are thermally expanded and a large compressive stress is applied to the heat-insulating sheet 10, the size (area) or number of contact points between silica nanoparticles is not significantly increased, and the heat-insulating performance can be maintained.

Furthermore, in this embodiment, even if silica particles overlapping with each other are present in the heat-insulating sheet 10, the size of the void portion formed between particles remains at about several tens of nm, and only a small convection indicated by arrow 15c occurs as well as the proportion of the convection range to the whole thickness is very slight. Consequently, heat transfer penetrating front to back of the heat-insulating sheet 10 is less likely to occur. Accordingly, when a silica nanoparticle is used as the first particle 21, the heat-insulating performance of the heat-insulating sheet 10 can be still further enhanced.

<Details of Heat-Insulating Sheet for Battery Pack>

Next, the first particle and second particle constituting the heat-insulating sheet for a battery pack are described in detail.

(Type of First Particle)

In the present invention, as the first particle, a silica nanoparticle is used. As the silica nanoparticle, wet silica, dry silica, aerogel, etc. can be used.

Furthermore, the silica nanoparticle as used in the present invention is a spherical or nearly spherical silica particle having an average particle diameter of a nanometer order of less than 1 μm.

(Average Particle Diameter of First Particle: 1 nm or More and 100 nm or Less)

As described above, the particle diameter of the first particle sometimes affects the heat-insulating performance of the heat-insulating sheet and therefore, when the average particle diameter of the first particle is limited to a predetermined range, a still higher heat-insulating performance can be obtained.

More specifically, when the average particle diameter of the first particle is 1 nm or more and 100 nm or less, the convective heat transfer and conductive heat transfer within the heat-insulating sheet can be suppressed particularly in a temperature range of less than 500° C., and the heat-insulating performance can be still further enhanced.

Here, the average particle diameter of the first particle is more preferably 2 nm or more, still more preferably 3 nm or more. Also, the average particle diameter of the first particle is more preferably 50 nm or less, still more preferably 10 nm or less.

(Type of Second Particle)

In the present invention, as the second particle, a metal oxide is used. As the metal oxide, titania, zirconia, zircon, barium titanate, zinc oxide, alumina, etc. can used. In particular, titania is a component having a high refractive index, compared with other metal oxides, and is highly effective in diffusely reflecting light and blocking radiant heat in a high temperature range of 500° C. or more, and it is therefore most preferable to use titania.

(Average Particle Diameter of Second Particle: 0.1 μm or More and 50 μm or Less)

The particle diameter of the second particle sometimes affects the effect of reflecting radiation heat, and therefore, when the average particle diameter of the second particle is limited to a predetermined range, a still higher heat-insulating performance can be obtained.

More specifically, when the average particle diameter of the second particle is 0.1 μm or more, it is sufficiently larger than the wavelength of light contributing to heating and provides efficient diffuse reflection of light, and in the existence range (mass ratio) of the second particle in the present invention, radiative heat transfer of heat within the heat-insulating sheet is suppressed in a high temperature range of 500° C. or more, so that the heat-insulating performance can be still further enhanced. On the other hand, when the average particle diameter of the second particle is 50 μm or less, even if the heat-insulating sheet is compressed, the number of contact points between particle is not increased, and a path for conductive heat transfer is less likely formed, so that the effect on the heat-insulating performance particularly in an ordinary temperature region dominated by conductive heat transfer can be reduced.

Here, the average particle diameter of the second particle is more preferably 1 μm or more, still more preferably 5 μm or more. In addition, the average particle diameter of the second particle is more preferably 30 μm or less, still more preferably 10 μm or less.

In the present invention, the average particle diameter can be determined by observing particles by means of a microscope, comparing them to a standard scale, and taking the average of arbitrary 10 particles.

(Content of First Particle: 60 Mass % or More and 95 Mass % or Less Relative to the Total Mass of First Particle and Second Particle)

In the present invention, the heat-insulating sheet contains a second particle so as to enhance the heat-insulating performance also in a high temperature range of 500° C. or more, and even if the amount added of the second particle relative to the first particle is small, the effect of suppressing radiative heat transfer of heat can be obtained. In addition, in order to obtain the effect of the first particle of suppressing convective heat transfer and conductive heat transfer of heat, it is preferable to increase the amount added of the first particle relative to the second particle.

Incidentally, the first particle is a silica nanoparticle and has a low bulk density (about 0.1 g/cm$^3$), whereas the second particle is larger in the average particle diameter than the first particle and has less voids, and in turn, the bulk density of the second particle is 10 times or more that of the first particle, for example, in the case of selecting titania, about 40 times (about 4 g/cm$^3$). Accordingly, when expressed by volume ratio (compared with when expressed by mass ratio), the ratio of the second particle is very small, but the second particle has only to block light in order to suppress radiative heat transfer and effectively functions even with a small amount. In this way, the mass ratio of the first particle and the second particle greatly affects the heat-insulating performance in the range from ordinary temperature to a high temperature of 500° C. or more and therefore, in the present invention, it is necessary to appropriately adjust the mass ratio of the first particle and the second particle.

When the content of the first particle in the heat-insulating sheet for a battery pack of the present invention is 60 mass % or more relative to the total mass of the first particle and the second particle, the first particle occupies the majority of the volume and suppresses convective heat transfer or conductive heat transfer of heat within the heat-insulating sheet, as a result, even if the heat-insulating sheet is compressed, the heat-insulating performance increases.

The content of the first particle in the heat-insulating sheet for a battery pack of the present invention is more preferably 70 mass % or more relative to the total mass of the first particle and the second particle. When the content of the first particle is 70 mass % or more relative to the total mass of the first particle and the second particle, the first particle even further occupies the majority of the volume and suppresses convective heat transfer or conductive heat transfer of heat within the heat-insulating sheet, as a result, the heat-insulating performance more increases.

On the other hand, when the content of the first particle is 95 mass % or less relative to the total mass of the first particle and the second particle, the content of the second particle is 5 mass % or more, and the second particle can exert the effect of blocking radiant heat. Consequently, in a high temperature range of 500° C. or more, radiative heat transfer of heat within the heat-insulating sheet can be suppressed, and the heat-insulating performance can be exerted.

The content of the first particle in the heat-insulating sheet for a battery pack of the present invention is more preferably 90 mass % or less relative to the total mass of the first particle and the second particle. When the content of the first particle is 90 mass % or less relative to the total mass of the first particle and the second particle, the content of the second particle is 10 mass % or more, and the second particle can even further exert the effect of blocking radiant heat. Consequently, in a high temperature range of 500° C. or more, radiative heat transfer of heat within the heat-insulating sheet can be suppressed, and even if the heat-insulating sheet is compressed, the heat-insulating performance can be exerted.

Furthermore, the average particle diameter of the second particle is preferably from 100 to 10,000 times the particle diameter of the first particle. Since both of the first particle and the second particle are an insulator, an electrostatic repulsive force acts between individual particles to form a given void. As the particle diameter is finer, the ratio of voids increases due to the effect of electrostatic repulsive force, and the bulk density decreases. When the average particle diameter of the second particle is 100 times or more the particle diameter of the first particle, the first particle includes many voids and ensures the cushioning property and heat-insulating performance, and the second particle ensures a particle diameter large enough to block diffusely reflected light, so that a heat-insulating performance can be ensured in a wide temperature region even if externally compressed.

In addition, when the average particle diameter of the second particle is 10,000 times or less the particle diameter of the first particle, a path for conductive heat transfer is less likely formed, and the effect on the heat-insulating performance particularly in ordinary temperature region dominated by conductive heat transfer can be reduced.

In the heat-insulating sheet for a battery pack of the present invention, it is preferred that the average particle diameter of the first particle is 1 nm or more and 100 nm or less and the average particle diameter of the second particle is 0.1 μm or more and 50 μm or less.

When the average particle diameter of the first particle is 1 nm or more and 100 nm or less, many voids are formed to provide also a cushioning property and therefore, even if a compressive force is externally applied, the convective heat transfer and conductive heat transfer can be efficiently suppressed over a wide temperature range centered on the ordinary temperature region.

In addition, when the average particle diameter of the second particle is 0.1 μm or more and 50 μm or less, the radiative heat transfer can be efficiently suppressed in a high temperature range of 500° C. or more. As a result, a high heat-insulating performance is expected to be obtained over a wide temperature range from a temperature during normal use of a battery to a high temperature of 500° C. or more even when a compressive force is externally applied.

In the heat-insulating sheet for a battery pack of the present invention, it is preferred that the content of the first particle is 60 mass % or more and 95 mass % or less relative to the total mass of the first particle and the second particle, the average particle diameter of the first particle is 1 nm or more and 100 nm or less, and the average particle diameter of the second particle is 0.1 μm or more and 50 μm or less.

When the average particle diameter of the first particle is 1 nm or more and 100 nm or less, many voids are formed to provide also a cushioning property and therefore, even if a compressive force is externally applied, the convective heat transfer and conductive heat transfer can be efficiently suppressed over a wide temperature range centered on the ordinary temperature region.

When the average particle diameter of the second particle is 0.1 μm or more and 50 m or less, the radiative heat transfer can be efficiently suppressed in a high temperature range of 500° C. or more.

When the content of the first particle is 60 mass % or more and 95 mass % or less relative to the total mass of the first particle and the second particle, the amount of the second particle necessary to suppress radiative heat transfer and the amount of the first particle necessary to suppress conductive•convective heat transfer and provide a cushioning property can be optimized.

As a result, a high heat-insulating performance is expected to be obtained in a well-balanced manner over a wide temperature range from a temperature during normal use of a battery to a high temperature of 500° C. or more even when a compressive force is externally applied.

Incidentally, the heat-insulating sheet for a battery pack may contain an inorganic balloon as a component for still further enhancing the heat-insulating effect, other than the first particle and the second particle, and furthermore, may contain components necessary for the forming into a heat insulator, such as binding material and coloring agent. These other components are also described in detail below.

(Inorganic Balloon: 60 Mass % or Less)

The heat-insulating sheet for a battery pack according to the present invention may contain 60 mass % or less of an inorganic balloon relative to the total mass of the heat-insulating sheet.

When the heat-insulating sheet contains 60 mass % or less of an inorganic balloon, the convective heat transfer or conductive heat transfer of heat within the heat-insulating sheet can be suppressed in a temperature range of less than 500° C., and the heat-insulating performance of the heat-insulating sheet can be still further enhanced.

The mass of the inorganic balloon relative to the total mass of the heat-insulating sheet is more preferably 50 mass % or less. As the inorganic balloon, at least one kind selected from shirasu balloon, silica balloon, fly ash balloon, perlite balloon, and glass balloon can be used.

(Average Particle Diameter of Inorganic Balloon: 1 μm or More and 100 μm or Less)

In the case where the heat-insulating sheet for a battery pack according to the present invention contains an inorganic balloon, when the average particle diameter of the inorganic balloon is appropriately adjusted, even if the battery cell is thermally expanded and a compressive stress is applied to the heat-insulating sheet, the effect of the change in density on the heat-insulating performance can be reduced.

More specifically, when the average particle diameter of the inorganic balloon is 1 μm or more and 100 μm or less, even if the density of the first particle and the second particle within the heat-insulating sheet is changed, reduction of the heat-insulating performance can still further be suppressed. Also, the average particle diameter of the inorganic balloon is more preferably 3 μm or more and 70 μm or less.

Incidentally, in the heat-insulating sheet for a battery pack according to the present invention, the total amount of the first particle, the second particle and the inorganic balloon each functioning as a heat insulator is preferably 40 mass % or more and 95 mass % or less relative to the total mass of the heat-insulating sheet for a battery pack. Within this range, a heat-insulating performance is readily obtained, and moreover, the strength as a sheet can be ensured, making it possible to suppress scattering of particles. Furthermore, the total amount of the first particle, the second particle and the inorganic balloon each functioning as a heat insulator is preferably 50 mass % or more and 80 mass % or less relative to the total mass of the heat-insulating sheet for a battery pack.

(Binding Material: 10 Mass % or More and 60 Mass % or Less)

The heat-insulating sheet for a battery pack according to the present invention can be formed by sintering, etc. even if it does not contain a binding material, but particularly, in the case where the heat-insulating sheet for a battery pack contains silica nanoparticles as the first particle, in order to keep the shape as a heat-insulating sheet, it is preferable to add a binding material at an appropriate content. The binding material as used in the present invention is sufficient if it holds the first particle and the second particle together, and the form thereof, such as a binder involving adhesion, a fiber physically entangling particles, or a heat-resistance resin adhering by an adhesive force, does not matter.

Here, as the binder, an organic binder, an inorganic binder, etc. can be used. The present invention does not particularly limit the type of the binder, but as the organic binder, a polymer aggregate, an acrylic emulsion, etc. can be used, and as the inorganic binder, for example, silica sol, alumina sol, aluminum sulfate, etc. can be used. These function as an adhesive after removal of a solvent such as water.

As the fiber, an organic fiber, an inorganic fiber, etc. can be utilized. The organic fiber is not particularly limited, but a synthetic fiber, a natural fiber, pulp, etc. can be utilized. The inorganic fiber is not particularly limited, but it is preferable to use an alumina fiber, a silica-alumina fiber, a silica fiber, a glass fiber, a glass wool, a rock wool, etc.

On the other hand, the binding material is made from a component having high thermal conductivity, compared with the first particle and the second particle, etc., and therefore, when the binding material is present in a void portion formed to an extent causing no convective heat transfer within the heat-insulating sheet, it affects the effect of the first particle of suppressing convective heat transfer and conductive heat transfer. Accordingly, in the heat-insulating sheet for a battery pack of the present invention, the content of the binding material is, relative to the total mass of the heat-insulating sheet, preferably 60 mass % or less, more preferably 50 mass % or less. In the heat-insulating sheet for a battery pack of the present invention, the content of the binding material is, relative to the total mass of the heat-insulating sheet, preferably 10 mass % or more, more preferably 20 mass % or more.

(Average Fiber Diameter of Inorganic Fiber: 0.1 μm or More and 20 μm or Less)

The inorganic fiber is a linear or needle-like fiber and contributes to enhancement of the mechanical strength and shape retention against a compressive stress from the battery cell of the heat-insulating sheet.

In order to obtain such an effect, in the case of using an inorganic fiber as the binding material, the average fiber diameter thereof is preferably 0.1 μm or more, more preferably 2 μm or more. However, if the inorganic fiber is too thick, the formability and processability into a heat-insulating sheet may be reduced, and therefore, the average fiber diameter is preferably 20 μm or less, more preferably 15 μm or less.

(Average Fiber Length of Inorganic Fiber: 0.1 mm or More and 20 mm or Less)

When an inorganic fiber is used as the binding material, fibers are entangled with each other at the time of forming as a heat-insulating sheet, and a sufficient surface pressure can be obtained.

In order to obtain such an effect, in the case of using an inorganic fiber, the average fiber length thereof is preferably 0.1 mm or more, more preferably 0.5 mm or more. However, if the average fiber length of the inorganic fiber is too long, inorganic fibers may be too strongly entangled with each other at the time of preparing a slurry solution by dispersing inorganic fibers in water in a papermaking step, and inorganic fibers sometimes tend to be unevenly accumulated after forming into a sheet shape.

Therefore, the average fiber length of the inorganic fiber is preferably 20 mm or less, more preferably 10 mm or less.

Incidentally, the fiber diameter and fiber length of the inorganic fiber can be measured as follow: after forming, inorganic fibers are pulled out of the sheet by means of tweezers taking care not to break them, observed by a microscope, and compared with a standard scale. Each of the fiber diameter and fiber length of the inorganic fiber is obtained as an average value of arbitrary 10 fibers.

(Thickness of Heat-Insulating Sheet: 0.1 mm or More and 30 mm or Less)

The thickness of the heat-insulating sheet for a battery pack according to the present invention is not particularly limited but is preferably in a range of 0.1 mm or more and 30 mm or less. When the thickness of the heat-insulating sheet is in the range above, sufficient mechanical strength can be obtained, and the forming can be facilitated.

(Manufacturing Method of Heat-Insulating Sheet for Battery Pack)

Subsequently, the method for manufacturing the heat-insulating sheet for a battery pack according to the present invention is described in detail.

The heat-insulating sheet according to this embodiment may be manufactured by die-forming a heat-insulating sheet material containing the first particle and the second material by a wet papermaking method, a dry forming method or a wet forming method or may be manufactured by an extrusion molding method. In the following, the manufacturing methods when obtaining the heat-insulating sheet by respective forming methods are described.

[Manufacturing Method of Heat-Insulating Sheet by Wet Papermaking Method]

In the wet papermaking method, first, the first particle and the second particle as well as, if desired, an inorganic fiber, organic fiber or organic binder serving as the binding material are mixed in water and stirred by means of a stirrer to obtain a mixed solution. Thereafter, the resulting mixed solution is injected into a forming machine in which a mesh for filtration is formed on the bottom, and the mixed solution is dewatered through the mesh to prepare a wet sheet. After that, the obtained wet sheet is heated and pressurized, and a heat-insulating sheet can thereby be obtained. Incidentally, an aeration drying treatment of flowing hot air through the wet sheet to dry the sheet may be conducted before the heating and pressurization step, but the sheet may be heated and pressurized in its wet state without conducting the aeration drying treatment.

[Manufacturing Method of Heat-Insulating Sheet by Dry Forming Method]

In the dry forming method, first, the first particle and the second particle as well as, if desired, an inorganic fiber, organic fiber or organic binder serving as the binding material are charged at a predetermined ratio into a mixer such as V-type mixer and after thoroughly mixing the materials charged into the mixer, the mixture is charged into a predetermined mold and pressed, and a heat-insulating sheet can thereby be obtained. During pressing, the mixture may be heated, if desired.

The pressing pressure is preferably from 0.98 to 9.80 MPa. If the pressing pressure is less than 0.98 MPa, it is likely that the obtained heat-insulating sheet cannot maintain the strength and is broken. On the other hand, if the pressing pressure exceeds 9.80 MPa, the processability may be reduced due to excessive compression and furthermore, since the bulk density rises, the sold heat transfer increases, leaving the possibility that the heat-insulating performance is reduced.

[Manufacturing Method of Heat-Insulating Sheet by Extrusion Molding Method]

In the extrusion molding method, first, the first particle and the second particle as well as, if desired, an inorganic fiber, organic fiber or organic binder serving as the binding material are added with water and kneaded in a kneader to prepare a paste. Thereafter, the obtained paste is extruded from a slit-like nozzle by using an extrusion molding machine and furthermore, dried, and a heat-insulating sheet for a battery pack can thereby be obtained. As the organic binder, use of methyl cellulose, water-soluble cellulose ether, etc. is preferred, but the organic binder can be used without any particular limitation as long as it is an organic binder commonly used in the case of employing an extrusion molding method.

[Battery Pack]

The battery pack according to the present invention has a configuration where, as illustrated in FIG. 2, a plurality of battery cells are disposed via the above-described heat-insulating sheet for a battery pack and the plurality of battery cells are connected in series or in parallel.

WORKING EXAMPLES

Working Examples of the heat-insulating sheet for a battery pack according to this embodiment are described blow, but the present invention is not limited to these Examples.

The following first particle, second particle and binding material were prepared, and these materials were thoroughly stirred and mixed to prepare a slurry. Using the obtained slurry, a heat-insulating sheet was formed by a papermaking method.

A slurry was prepared by adding, as the first particle, 56 mass % of silica nanoparticle (average particle diameter: 5 nm), as the second particle, 24 mass % of titania (average particle diameter: 8 μm) (first particle:second particle=70 mass %:30 mass %), and, as the binding material, 11 mass % of glass fiber (average fiber diameter: 10 μm, average fiber length: 5 mm), 8 mass % of pulp fiber, and 1 mass % of polymer aggregate, and thoroughly stirring and mixing these materials. The obtained slurry was subjected to papermaking to obtain a heat transfer-inhibiting sheet (Heat-Insulating Sheet No. 1).

Incidentally, the drying was conducted at 110° C., and the size of the obtained heat-insulating sheet was a width of 80 mm, a length of 80 mm, and a thickness of 1 mm.

With respect to heat-insulating sheets in which the mass ratio of the first particle and the second particle was variously changed, the thermal conductivity was measured at a plurality of points over a temperature range from a temperature during normal use of a battery (about 30° C.) to a high temperature of 500° C. or more (about 850° C.). Here, the thermal conductivity was measured using a transient hot wire method in conformity with the JIS method (R2616).

Figure 3:
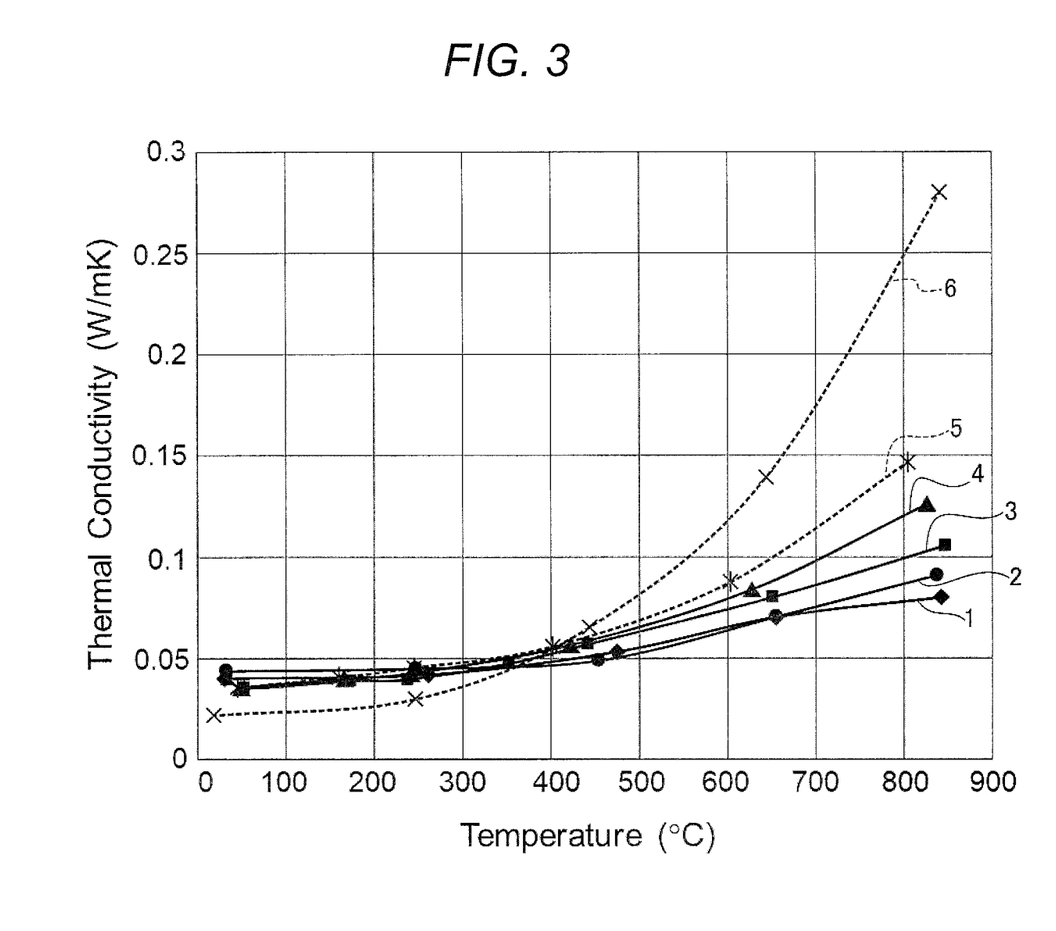
FIG. 3 is a graph illustrating a change in the thermal conductivity according to the mass ratio of a first particle and a second particle in the heat-insulating sheet for a battery pack, with a thermal conductivity as an ordinate and a temperature as an abscissa.

The content of the first particle (mass % relative to the total amount of the first particle and the second particle) in each heat-insulating sheet is shown in Table 1 below, and the thermal conductivity of the heat-insulating sheet at each temperature is illustrated in FIG. 3. In FIG. 3, the numbers 1 to 6 correspond to Heat-Insulating Sheet Nos. 1 to 6 shown in Table 1, respectively. Furthermore, in Table 1 and FIG. 3, Heat-Insulating Sheet No. 6 is an example of using silica aerosol as the first particle, in which the binding material shown in Table 1 is not contained.

TABLE 1

| Heat-Insulating Sheet No. | Content Relative to Total Mass of Heat-Insulating Sheet (mass %) | | Content Relative to Total Amount of First Particle and Second Particle (mass %) | |
|---|---|---|---|---|
| | First Particle | Second Particle | First Particle | Second Particle |
| 1 | 56 | 24 | 70 | 30 |
| 2 | 64 | 16 | 80 | 20 |
| 3 | 72 | 8 | 90 | 10 |
| 4 | 76 | 4 | 95 | 5 |
| 5 | 80 | 0 | 100 | 0 |
| 6 | 50 | 0 | 100 | 0 |

In Battery-Pack Heat-Insulating Sheet Nos. 1 to 4, a metal oxide (titania) is contained as the second particle, and the content of the first particle relative to the total mass of the first particle and the second particle is within the scope of the present invention. Accordingly, an excellent heat-insulating performance could be obtained in a temperature range from a temperature during normal use of a battery (about 30° C.) to a high temperature of 500° C. or more (about 850° C.). In particular, the thermal conductivity in a high temperature range of 500° C. or more decreased with increase in the content rate of the second particle, revealing that the heat-insulating performance was enhanced.

On the other hand, in Heat-Insulating Sheet Nos. 5 and 6, the second particle is not contained and consequently, the thermal conductivity was high in a high temperature range of 500° C. or more. Incidentally, although both of Heat-Insulating Sheet Nos. 5 and 6 did not contain the second particle, it is considered that due to the effect of magnesium silicate fiber contained in Heat-Insulating Sheet No. 5, the thermal conductivity in a high temperature region of 500° C. or more decreased, compared with Heat-Insulating Sheet No. 6.

Figure 4:
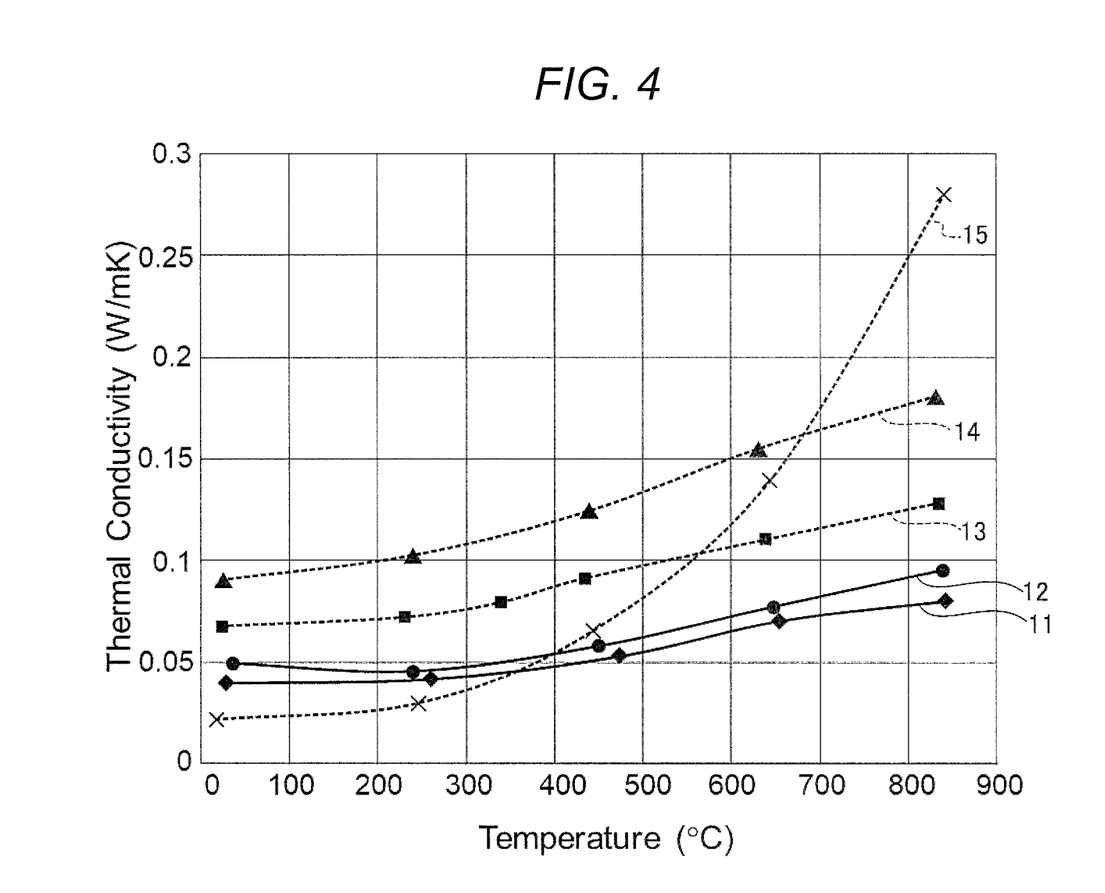
FIG. 4 is a graph illustrating a change in the thermal conductivity according to the density of the heat-insulating sheet for a battery pack, with a thermal conductivity as an ordinate and a temperature as an abscissa.

Next, heat-insulating sheets having various densities were formed by a papermaking method using the same components and contents as in Heat-Insulating Sheet No. 1 and measured for the change in thermal conductivity due to the density of the heat-insulating sheet by the transient hot wire method above. The type and density of each heat-insulating sheet are shown in Table 2 below, and the thermal conductivity at each temperature of heat-insulating sheets differing in density from one another is illustrated in FIG. 4. In FIG. 4, the numbers 11 to 15 correspond to Heat-Insulating Sheet Nos. 11 to 15 shown in Table 2, respectively. Incidentally, Heat-Insulating Sheet Nos. 11 and 12 are examples of setting the content of the first particle (silica nanoparticle) to be 70 mass % relative to the total mass of the first particle and the second particle. In addition, Heat-Insulating Sheet Nos. 13 and 14 are examples of using aluminum hydroxide powder in place of silica nanoparticle and titania, and Heat-Insulating Sheet No. 15 is an example of using aerogel.

TABLE 2

| Heat-Insulating Sheet No. | Component | | Density (g/cm$^3$) |
|---|---|---|---|
| | First Particle | Second Particle | |
| 11 | nanosilica | titania | 0.47 |
| 12 | nanosilica | titania | 0.61 |
| 13 | aluminum hydroxide powder | | 1.00 |
| 14 | aluminum hydroxide powder | | 1.50 |
| 15 | aerogel | | 0.19 |

As shown in Table 2 and FIG. 4, Heat-Insulating Sheet Nos. 11 and 12 contained silica and titania at an appropriate ratio and exhibited a low thermal conductivity in any temperature range, compared with Heat-Insulating Sheet Nos. 13 and 14 using an aluminum hydroxide powder. In addition, compared with Heat-Insulating No. 15 using silica aerosol, an excellent heat-insulating performance could be obtained particularly in a temperature range of about 400° C. or more. Furthermore, in Heat-Insulating Sheet Nos. 11 and 12 where a silica nanoparticle having a very small particle diameter was used as the first particle, even if the compressive stress on the heat-insulating sheet increased and the density rose, the rise of the density was little influential, and excellent heat-insulating performance could be obtained in both heat-insulating sheets.

On the other hand, as demonstrated by Heat-Insulating Sheet Nos. 13 and 14, due to a rise of the density from 1.00 (g/cm$^3$) to 1.50 (g/cm$^3$), the thermal conductivity was significantly increased in all temperature regions. These indicate that even when battery cells disposed on both sides of the heat-insulating sheet are thermally expanded and a compressive stress is applied to the heat-insulating sheets, since silica nanoparticles having an average particle diameter of 1 nm to 100 nm are used as the first particle, excellent heat-insulating performance is maintained.

While various embodiments have been described hereinabove by referring to the drawings, needless to say, the present invention should not be construed as limited to these examples. It is obvious that one skilled in the art can arrive at various changed examples or modified examples within the scope of claims, and these should of course be understood to belong to the technical scope of the present invention. In addition, individual constituent elements in the embodiments above may be arbitrarily combined without departing from the gist of the invention.

This application is based on Japanese Patent Application (Patent Application No. 2019-154855) filed on Aug. 27, 2019, the contents of which are incorporated herein by way of reference.

REFERENCE SIGNS LIST

10: Heat-insulating sheet
10a, 10b: Surface
20: Battery cell
21: First particle
22: Second particle
30: Battery case
100: Battery pack

What is claimed is:

1. A heat-insulating sheet for a battery pack, the heat-insulating sheet being interposed between battery cells of the battery pack in which the battery cells are connected in series or in parallel,
wherein the heat-insulating sheet for the battery pack contains a first particle made from a silica nanoparticle and a second particle made from a metal oxide,
wherein a content of the first particle is 60 mass % or more and 95 mass % or less relative to a total mass of the first particle and the second particle, and
wherein the silica nanoparticle of the first particle is wet silica.

2. The heat-insulating sheet for the battery pack according to claim 1,
wherein the first particle has an average particle diameter of 1 nm or more and 100 nm or less.

3. The heat-insulating sheet for the battery pack according to claim 1,
wherein the second particle is at least one kind selected from titania, zirconia, zircon, barium titanate, zinc oxide, and alumina.

4. The heat-insulating sheet for the battery pack according to claim 1,
wherein the second particle is titania.

5. The heat-insulating sheet for the battery pack according to claim 1,
wherein the second particle has an average particle diameter of 0.1 μm or more and 50 μm or less.

6. The heat-insulating sheet for the battery pack according to claim 1, comprising
a binding material made from at least one kind selected from a fiber, a binder and a heat-resistant resin,
wherein a content of the binding material is 10 mass % or more and 60 mass % or less relative to a total mass of the heat-insulating sheet for the battery pack.

7. The heat-insulating sheet for the battery pack according to claim 1, comprising
60 mass % or less of an inorganic balloon relative to the total mass of the heat-insulating sheet for the battery pack.

8. The heat-insulating sheet for the battery pack according to claim 7,
wherein the inorganic balloon is at least one kind selected from shirasu balloon, silica balloon, fly ash balloon, perlite balloon, and glass balloon.

9. The heat-insulating sheet for the battery pack according to claim 7,
wherein the inorganic balloon has an average particle diameter of 1 μm or more and 100 μm or less.

10. A battery pack,
wherein battery cells are disposed via the heat-insulating sheet for the battery pack according to claim 1, and
wherein the battery cells are connected in series or in parallel.

11. The heat-insulating sheet for the battery pack according to claim 1,
wherein the content of the first particle is 70 mass % or more and 90 mass % or less relative to a total mass of the first particle and the second particle.

12. The heat-insulating sheet for the battery pack according to claim 1,
wherein the content of the first particle is 70 mass % or more and 80 mass % or less relative to a total mass of the first particle and the second particle.

13. The heat-insulating sheet for the battery pack according to claim 1, further comprising a linear or needle-shaped inorganic fiber.

14. The heat-insulating sheet for the battery pack according to claim 1,
wherein the silica nanoparticle is contained as a secondary particle with aggregation, the secondary particle having fine voids.

15. The heat-insulating sheet for the battery pack according to claim 1,
wherein the first particle and the second particle are contained in 50 mass % or more relative to a total mass of the heat-insulating sheet.

16. The heat-insulating sheet for the battery pack according to claim 1,
wherein the content of the first particle is 70 mass % or more and 95 mass % or less relative to the total mass of the first particle and the second particle.

* * * * *